United States Patent
DeBow et al.

(10) Patent No.: US 11,624,495 B2
(45) Date of Patent: Apr. 11, 2023

(54) SYSTEMS AND METHODS FOR STABILIZING OPTICAL SHEETS IN LUMINAIRES

(71) Applicant: ABL IP Holding LLC, Atlanta, GA (US)

(72) Inventors: Jonathan Lemoine DeBow, Chamblee, GA (US); Melissa N. Ricketts, Conyers, GA (US); Eric William Teather, Elkton, MD (US); Robert Michael Ezell, Brunswick, OH (US); Joel Mikael Petersen, Valley Village, CA (US)

(73) Assignee: ABL IP HOLDING LLC, Atlanta, GA (US)

( * ) Notice: Subject to any disclaimer, the term of this patent is extended or adjusted under 35 U.S.C. 154(b) by 366 days.

(21) Appl. No.: 16/985,752

(22) Filed: Aug. 5, 2020

(65) Prior Publication Data

US 2020/0370731 A1 Nov. 26, 2020

Related U.S. Application Data

(63) Continuation-in-part of application No. 16/879,545, filed on May 20, 2020.

(Continued)

(51) Int. Cl.
*F21V 15/04* (2006.01)
*F21V 3/06* (2018.01)

(52) U.S. Cl.
CPC ............ *F21V 15/04* (2013.01); *F21V 3/0625* (2018.02)

(58) Field of Classification Search
None
See application file for complete search history.

(56) References Cited

U.S. PATENT DOCUMENTS

| D177,568 S | 5/1956 | Hills et al. |
| D668,371 S | 10/2012 | Alpaslan et al. |

(Continued)

FOREIGN PATENT DOCUMENTS

| JP | 2007003852 | ‡ | 1/2007 |
| KR | 100986782 | ‡ | 10/2010 |

(Continued)

OTHER PUBLICATIONS

Application No. PCT/US2020/033862, International Preliminary Report on Patentability, dated Dec. 2, 2021, 6 pages.‡

(Continued)

*Primary Examiner* — Ashok Patel
(74) *Attorney, Agent, or Firm* — Kilpatrick Townsend & Stockton LLP

(57) ABSTRACT

In one or more embodiments, a luminaire includes a housing, a light source coupled with the housing, an optical sheet coupled with the housing, and a film stabilizer coupled with the housing. The optical sheet includes a first surface and an opposing second surface that are both disposed substantially horizontally when the luminaire is in an installed orientation. The first surface is disposed facing the light source, so that when the light source emits light, the light passes first through the first surface and subsequently through the second surface. The film stabilizer includes a third surface and an opposing fourth surface. The film stabilizer is disposed with the third surface adjacent to the second surface of the optical sheet, and provides mechanical support for the optical sheet.

11 Claims, 4 Drawing Sheets

Related U.S. Application Data

(60) Provisional application No. 63/022,871, filed on May 11, 2020, provisional application No. 62/883,037, filed on Aug. 5, 2019, provisional application No. 62/850,135, filed on May 20, 2019.

(56) References Cited

U.S. PATENT DOCUMENTS

| | | | |
|---|---|---|---|
| D784,593 S | 4/2017 | Ambrozus | |
| D819,860 S | 6/2018 | Clark | |
| D827,917 S | 9/2018 | Botti | |
| D835,333 S | 12/2018 | Silver | |
| 10,838,195 B2 | 11/2020 | Kasahara et al. | |
| D929,031 S | 8/2021 | Sieczkowski | |
| 2008/0310171 A1 ‡ | 12/2008 | Hiraishi | G02B 5/0231 362/339 |
| 2009/0047486 A1 ‡ | 2/2009 | Jones | G02B 5/045 428/206 |
| 2010/0195314 A1 ‡ | 8/2010 | Shinkai | G02B 3/0043 362/97 |
| 2011/0051457 A1 | 3/2011 | Chen | |
| 2013/0027971 A1 | 1/2013 | Huang et al. | |
| 2013/0107543 A1 ‡ | 5/2013 | Parker | G02B 6/0061 362/326 |
| 2017/0129272 A1 ‡ | 5/2017 | Rich | B42D 25/378 |
| 2019/0293262 A1 | 9/2019 | Yin et al. | |
| 2020/0116571 A1 | 4/2020 | Kasamori et al. | |
| 2020/0196391 A1 | 6/2020 | Park | |
| 2022/0003364 A1 ‡ | 1/2022 | Leather | F21V 5/005 |

FOREIGN PATENT DOCUMENTS

| | | | |
|---|---|---|---|
| KR | 20110001524 | ‡ | 1/2011 |
| WO | WO-2012059931 | ‡ | 5/2012 |

OTHER PUBLICATIONS

U.S. Appl. No. 17/475,558, Non-Final Office Action, dated Dec. 21, 2021, 8 pages.‡

‡ imported from a related application

SYSTEMS AND METHODS FOR STABILIZING OPTICAL SHEETS IN LUMINAIRES

CROSS-REFERENCE TO RELATED APPLICATIONS

This application is a non-provisional application of, and claims priority to, U.S. Provisional Patent Application No. 62/883,037, filed 5 Aug. 2019, which is incorporated herein in its entirety for all purposes. This application is also a continuation-in-part of U.S. patent application Ser. No. 16/879,545, filed 20 May 2020, which claims the benefit of priority to U.S. Provisional Patent Applications Nos. 62/850,135, filed 20 May 2019, and 63/022,871, filed 11 May 2020. The disclosures of the above-identified patent applications are incorporated by reference herein in their entireties for all purposes.

BACKGROUND

Luminaires, or light fixtures, for built-in installation may be designed to meet goals such as emitted light intensity or distribution, power consumption, cost, size, mechanical stability, and visual aesthetics. Realizing certain ones of these goals can present obstacles to meeting others. For example, one size goal can be for a luminaire to be as close to flat as possible, for mounting in low clearance ceiling applications, hanging on walls and the like. When a flat luminaire is desired, a typical trade-off in terms of visual aesthetics is to accept that the luminaire will appear flat. That is, the luminaire may have visible brightness or color variations, but will not provide a visible appearance of having any depth. Thus, the size goal of providing a flat luminaire can conflict with a visual aesthetic goal to provide a three-dimensional look. Goals of providing a high lumen output and/or a mechanically stable luminaire can conflict with both the size and visual aesthetic goals. There remains a need in the lighting arts for systems and methods that can mitigate these design tradeoffs by allowing more of the goals to be met with little to no impact on others of the goals.

SUMMARY

In one or more embodiments, a luminaire includes a housing, a light source coupled with the housing, an optical sheet coupled with the housing, and a film stabilizer coupled with the housing. The optical sheet includes a first surface and an opposing second surface that are both disposed substantially horizontally when the luminaire is in an installed orientation. The first surface is disposed facing the light source, so that when the light source emits light, the light passes first through the first surface and subsequently through the second surface. The film stabilizer includes a third surface and an opposing fourth surface. The film stabilizer is disposed with the third surface adjacent to the second surface of the optical sheet, and provides mechanical support for the optical sheet.

In one or more embodiments, a luminaire includes a housing, a light source coupled with the housing, an optical sheet, and a rigid and transparent film stabilizer coupled with the housing. The light source is capable of providing light across an area that is parallel with the ceiling, wherein a span length represents a distance across the area. The optical sheet includes a first surface and an opposing second surface. The first surface and the second surface extend substantially across the area. The first surface is disposed facing the light source, so that when the light source emits light, the light passes first through the first surface and subsequently through the second surface. The optical sheet is formed of a flexible material that cannot fully support its weight across the area when the housing is installed within the ceiling, such that the optical sheet will sag by an amount that is at least 0.2% of the span length, without support at the second surface. The rigid and transparent film stabilizer includes a third surface and an opposing fourth surface. The third surface and the fourth surface extend substantially across the area. The film stabilizer is coupled with the housing, and is disposed with the third surface adjacent to the second surface of the optical sheet. The film stabilizer provides mechanical support for the optical sheet so that the optical sheet and the film stabilizer, together, sag less than 0.1% of the span length.

In one or more embodiments, a luminaire includes a light source, a light guide, an optical sheet, and a film stabilizer. The light guide is configured to receive a first light from the light source through an edge of the light guide, and to emit at least a portion of the first light as a second light, from a light emitting side surface of the light guide. The optical sheet includes a first surface and an opposing second surface. The first surface is disposed adjacent to the light guide. The optical sheet receives the second light through the first surface. The second surface emits a third light with an altered directionality as compared with the second light. The film stabilizer is disposed adjacent to the second surface of the optical sheet, and provides mechanical support for the optical sheet.

In one or more embodiments, a light guide is formed of an optical material and includes a first edge configured to receive a first light from a light source; a back surface and a front surface. The back surface is orthogonal to the first edge, and forms a plurality of light scattering regions, such that a portion of the first light is scattered by the light scattering regions to form a second light. The front surface is parallel to the back surface, and forms light redirecting features that redirect the second light to form a third light that is emitted from the front surface.

DETAILED DESCRIPTION

Figure 1:
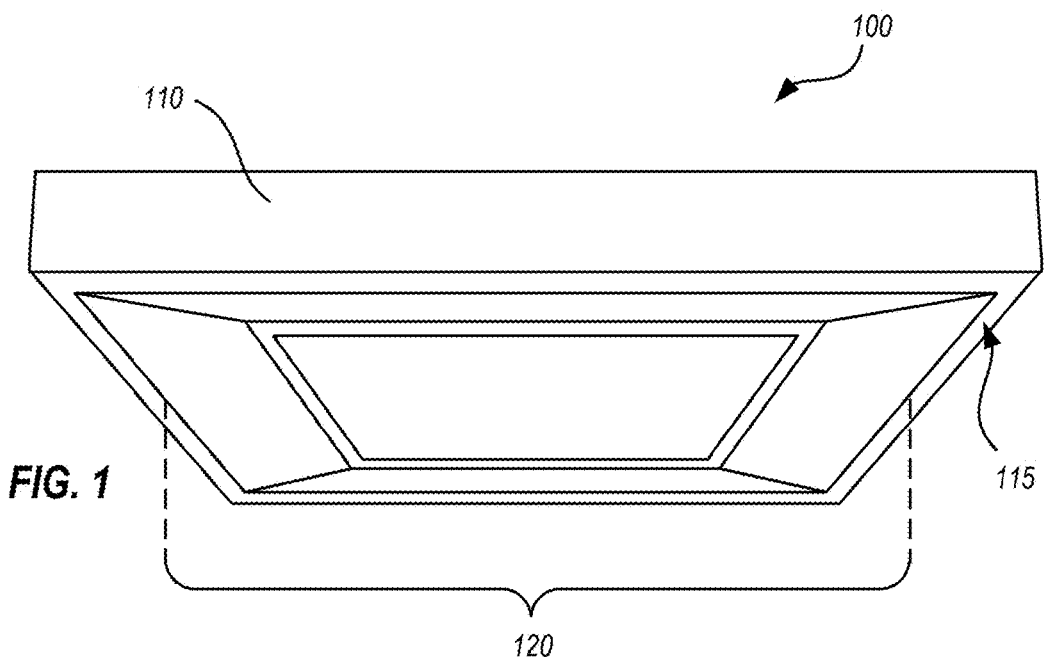
FIG. 1 schematically illustrates, in an upward-looking perspective view, a luminaire that includes an optical sheet and a film stabilizer, in accord with one or more embodiments.

The subject matter of embodiments of the present invention is described here with specificity to meet statutory requirements, but this description is not intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Each example is provided by way of illustration and/or explanation, and not as a limitation. For instance, features illustrated or described as part of one embodiment may be used on another embodiment to yield a further embodiment. Upon reading and comprehending the present disclosure, one of ordinary skill in the art will readily conceive many equivalents, extensions, and alternatives to the specific, disclosed luminaire types, all of which are within the scope of embodiments herein.

In the following description, positional terms like "above," "below," "vertical," "horizontal" and the like are sometimes used to aid in understanding features illustrated in the drawings as presented, that is, in the orientation in which the labels and reference numerals in each drawing read normally. These meanings are adhered to, notwithstanding that the luminaires herein may be manufactured and/or used in other than the orientations shown.

Certain embodiments herein provide optical layer stacks, portions of luminaires, and/or complete luminaires, that are minimal in size, and may include a flat light-emitting area, yet may provide a visible sense of depth, and are mechanically stable. For example, in some luminaire embodiments, light emitters such as light-emitting diodes (LEDs) inject light into a light guide that internally reflects the light until some or all of the light is scattered out of the light guide toward optical sheets, diffusers and the like that modify the light distribution. The light guide and the light emitters provide a luminaire that is substantially flat, which may have for example a frame that is 2-3 cm thick, enclosing the light guides and other structure that are less than 2 cm thick in central areas of the luminaire. In other luminaire embodiments, individual light emitters emit light directly toward the optical sheets, diffusers and the like; these embodiments may not be as thin as light guide based embodiments. For example, in some cases fixture depth is needed to mix and smooth light from individual light emitters, as discussed below in connection with FIG. 2D. In either case, light passes through an optical sheet that may impart a three-dimensional aspect to the light, that is, the light is modified according to a spatially varying pattern within the optical sheet. The pattern can divert light into a different projected light distribution at each point. In some embodiments, the modified, projected light can change as a viewer's angle changes with respect to the luminaire, so that a luminaire with a generally flat surface has an appearance of depth (e.g., appears three-dimensional) even though the luminaire surface is flat. Luminaires of any of the types described here can be quite large in light-emitting area, e.g., 60×60 cm (2×2 feet), 60×120 cm (2×4 feet) or larger.

FIG. 1 schematically illustrates, in an upward-looking perspective view, a luminaire 100 that includes an optical sheet and a film stabilizer, in accord with one or more embodiments. Luminaire 100 includes a housing 110 that may form an optional bezel 115, although bezel 115 is not required. Luminaire 100 emits light from a light-emitting surface 120. Light-emitting surface 120 may form a visible image thereon, and the image may be visible when luminaire 100 is emitting light, and/or turned off. In FIG. 1, the image formed by light-emitting surface 120 is shown as resembling a picture frame that may have a three-dimensional appearance. However, the three-dimensional appearance is illusory, and is generated by the optical sheet, which is actually flat, as discussed below.

Figure 2A:
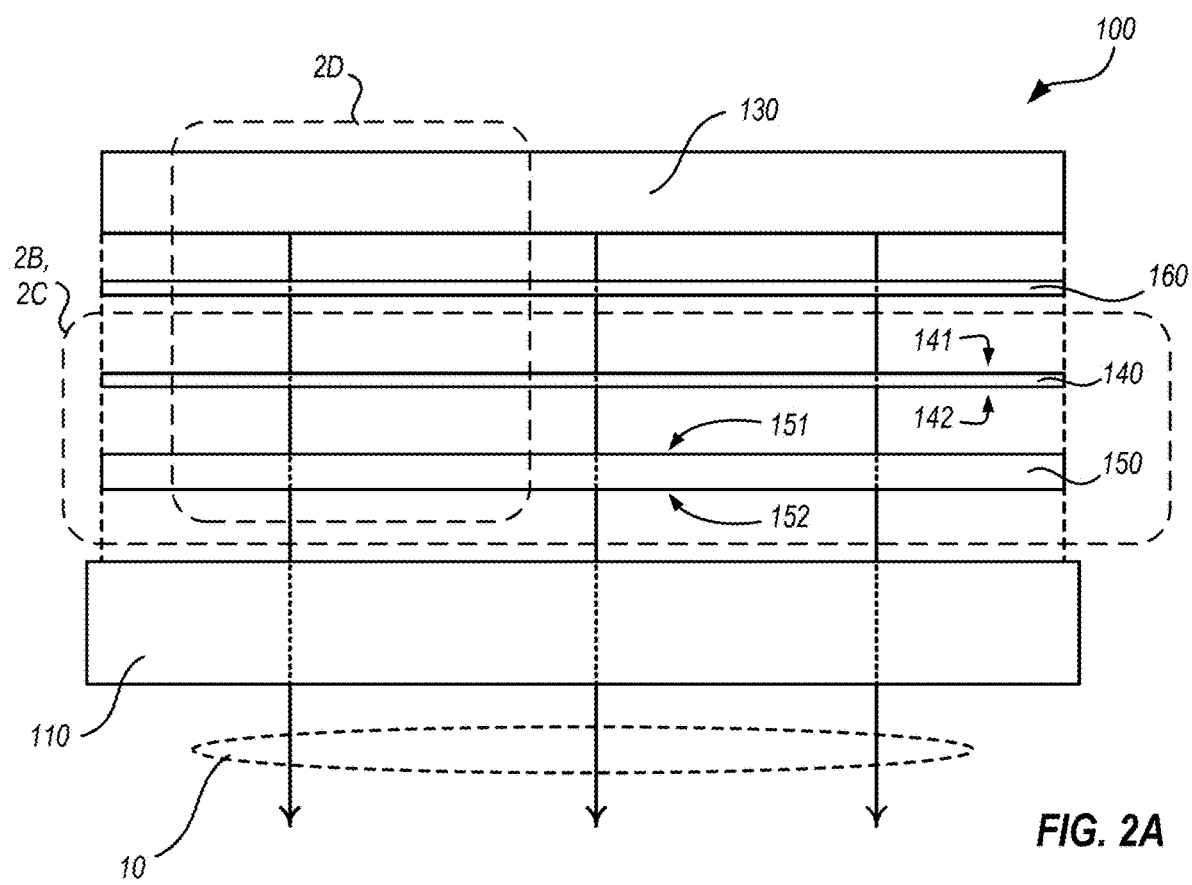
FIG. 2A schematically illustrates, in an exploded view, certain components of the luminaire of FIG. 1.

FIG. 2A schematically illustrates, in an exploded view, certain components of luminaire 100. Housing 110 is shown schematically in an orientation of use, which is generally horizontal, with light 10 being emitted generally toward nadir when luminaire 100 is assembled and operating (FIG. 2A shows light 10 schematically to facilitate explanation of how the light interacts with the various components of luminaire 100). The schematic illustration of FIG. 2A shows optical components only. Electrical and/or mechanical components like (but not limited to) wiring, circuit boards, driving electronics, fasteners and the like may be present, but are not shown for clarity of illustration. Portions of FIG. 2A marked 2B, 2C and 2D respectively are illustrated in further detail in FIGS. 2B, 2C and 2D.

A light source 130 emits light 10. The term "light source" herein means one or more light emitters as well as direct packaging and mechanical support structure for the light emitter(s), and optics that may shape the light from the emitters into an outgoing light distribution. For example, an LED chip acting as a light emitter may be packaged with a lens for shaping light from the chip; the LED thus packaged may be considered a light source 130, or the packaged LED may be used in a structure with additional packaged LEDs and/or optics to form a light source 130. Certain advantageous light sources 130 are shown in greater detail in FIGS. 3A, 3B and 3C, and are discussed further below.

In FIG. 2A, an optical sheet 140 redirects and/or modifies intensity of light 10 so as to create an image that is discernable at a typical viewing distance from the luminaire. Optical sheets that generate such effects are described in greater detail in U.S. patent application Ser. No. 16/879,545, which is incorporated herein by reference. Optical sheet 140 has a first surface 141 and a second surface 142, both of which are disposed substantially horizontally (e.g., within about 30 degrees of horizontal) when luminaire 100 is in an installed orientation. First surface 141 faces light source 130, so that when light source 130 emits light 10, the light 10 passes first through first surface 141 and subsequently through second surface 142.

Some luminaires of this type exhibit a variety of issues. For example, optical sheet 140 may exhibit mechanical issues such as drooping or sagging across large surfaces and/or at elevated operating temperatures, simply under its own weight. For example, in some embodiments, an optical sheet 140 may be formed of thin, somewhat expensive material, such as polyethylene terephthalate (PET) as thin as about 250 microns. Conversely, optical sheet 140 may acquire wrinkles or buckling during its own fabrication process, which may be mitigated by sandwiching optical sheet 140 between two rigid sheets. Optical sheet 140 may also pick up visible fingerprints during its own fabrication, and/or during integration into the luminaire 100, or during installation of the luminaire 100.

To provide mechanical robustness (and, optionally, other advantages as discussed below) a film stabilizer 150 may be provided. Film stabilizer 150 is thick and/or mechanically strong enough to hold optical sheet 140 in place within luminaire 100 without sagging, or at least to reduce sagging to an amount that is tolerable in manufacturing and operation of luminaire 100. Film stabilizer 150 is placed under optical sheet 140, in an orientation of use. Film stabilizer 150 has a first surface 151 and a second surface 152, both of which are disposed substantially horizontally when luminaire 100 is in an installed orientation. First surface 151 of film stabilizer 150 is generally adjacent to, and/or in contact with, second surface 142 of optical sheet 140. Film stabilizer 150 is advantageously substantially transparent (e.g., at least 90% transparent), and light weight. Suitable materials for film stabilizer 150 include, for example, PMMA (polymethyl methacrylate), polycarbonates and polyethylene.

In embodiments that utilize a light guide (see FIGS. 3C, 4) optical sheet 140 may be sandwiched between the light guide and film stabilizer 150. In embodiments that use other types of light emitters (e.g., see FIGS. 3A, 3B) film stabilizer 150 may again be below optical sheet 140, so that optical sheet 140 does not sag due to gravity once installed horizontally. In some of these embodiments, optical sheet 140 may be sandwiched between a film stabilizer 150 beneath, and a diffuser 160 above, to mitigate wrinkling or buckling.

Figure 2B:
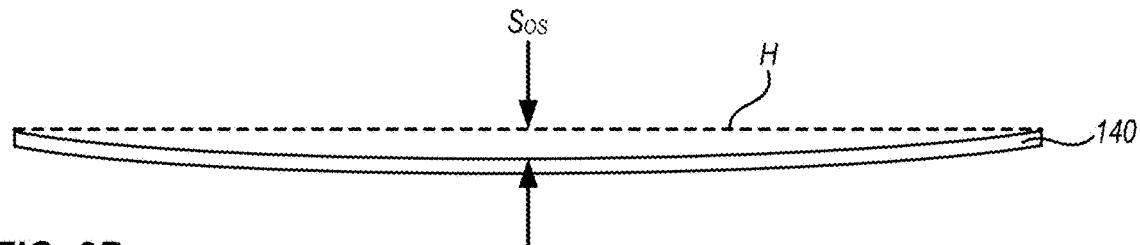
FIG. 2B schematically illustrates an extent to which an optical sheet may sag without support from a film stabilizer.

FIG. 2B schematically illustrates an extent to which optical sheet 140 may sag without film stabilizer 150. In FIG. 2B, the vertical dimension is exaggerated with respect to the horizontal dimension. In FIG. 2B, optical sheet 140 is supported only at its left and right edges, with its top surface supported at opposite ends of a horizontal line H. Optical sheet 140 sags due to gravity by an amount $S_{OS}$. If optical sheet 140 is, for example, a PMMA sheet of 0.7 mm nominal thickness, it may sag by an amount $S_{OS}$ of around 3 mm across a span of about 570 mm (e.g., an inner dimension of a nominal 2×2 foot luminaire for use in a standard modular ceiling). This amount of sagging amounts to about 0.5% of the span length at nominal temperatures (but will vary with temperature and humidity changes) and is visually evident. This amount of sagging, for example where $S_{OS}$ is at least 0.2%-1.0% (or more) of a span length, can also cause other detrimental effects, such as wrinkling upon incidental contact with objects during manufacturing, or even spontaneous wrinkling caused by humidity and/or temperature cycles.

Figure 2C:
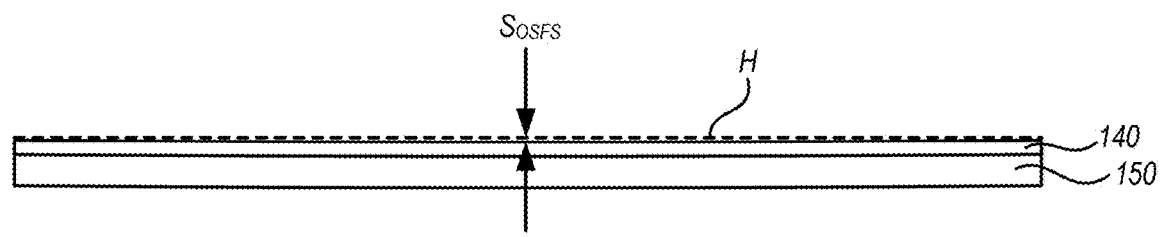
FIG. 2C illustrates what degree of sag may still be present in an optical sheet when a film stabilizer is present, in accord with one or more embodiments.

FIG. 2C illustrates what degree of sag may still be present in optical sheet 140, when film stabilizer 150 is present. In FIG. 2C, film stabilizer 150 is supported such that again, a top surface of optical sheet 140 is at opposite ends of horizontal line H. Film stabilizer 150 may be, for example, a 3 mm layer of PMMA, and may or may not have surface treatments to provide diffusion or other light redirecting properties. While all real world materials will sag somewhat when unsupported, the extra stiffness provided by film stabilizer 150 is sufficient to reduce a net sag of optical sheet 140 to an amount $S_{OSFS}$ of 0.5 mm or less across the same span of about 570 mm (e.g., $S_{OSFS}$ is about 0.1% of the span length, or less). This is sufficient to avoid the visual and mechanical problems discussed above.

Advantageously, film stabilizer 150 may be manufactured with a textured surface that minimizes any visual effect due to fingerprints that may be imparted during manufacturing. When a textured surface is utilized, the type and orientation of the texturing can be controlled to provide diffusion in one or more directions. The degree of diffusion provided can vary from slight (to preserve the directionality and/or intensity variations of light as modified by optical sheet 140) or severe (to provide substantially unidirectional light output, but possibly blending out certain effects of optical sheet 140). In one or more embodiments, the diffusion provided is within a range of 2 degrees to 10 degrees, and may be about 5 degrees. The diffusion provided by film stabilizer 150 may be different in different directions transverse to the direction of the light incident thereon, and may be uniform across film stabilizer 150, or may vary spatially, similarly to variations provided by optical sheet 140. For example, a diffusion pattern provided by film stabilizer 150 may match or correspond to that provided by optical sheet 140, or may vary in some other spatial manner. Diffusion provided by film stabilizer 150 may be greater near the center of luminaire 100 as compared to diffusion provided at edges of luminaire 100, or the reverse. The optical performance aspects discussed above are advantageously not at the expense of transparency, that is, the film stabilizer should remain at least 90% transparent while diffusing or redirecting light. For example, certain regions of an optical sheet 140 could be configured to spread light passing therethrough, more in one direction than another, perhaps spreading the light more in an X axis than in a Y axis. Then, a surface of an adjacent film stabilizer 150 could also be configured to spread light passing therethrough, more in one direction than another, with the more-spreading regions spreading the light more in a direction transverse to the spread of received light. That is, if the optical sheet 140 spreads light more across the X axis than the Y axis in certain spatial regions, the film stabilizer 150 could be configured to spread the light more across the Y axis than the X axis, in the same spatial regions. The result would be to provide an output light distribution that is wider than a typical Lambertian distribution, in both axes.

Figure 2D:
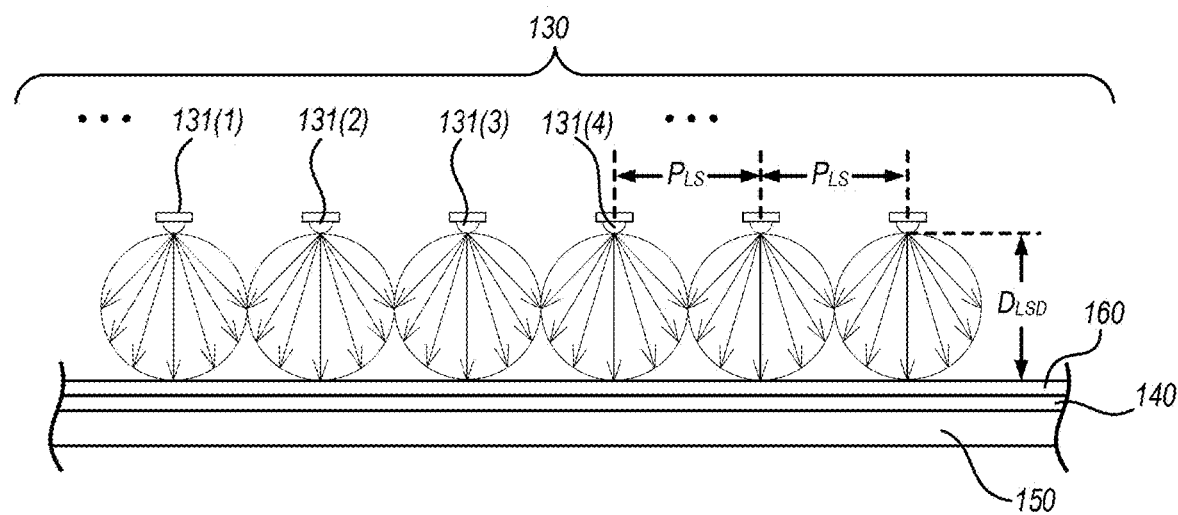
FIG. 2D schematically illustrates spacing among discrete light sources, and a distance between the light sources and a diffuser, that is effective to mitigate appearance of individual light sources as seen to a viewer of a luminaire, in accord with one or more embodiments.

An optional diffuser 160 may also be included in luminaire 100. Diffuser 160 is especially useful when light source 130 includes multiple point or line emitters. The term "point emitters" herein means a light emitter that provides light across an area less than 1 cm$^2$ in size. Light density provided by such emitters can be so high that when discernable within a luminaire, they are distracting and/or painful for human viewers to look at. When diffuser 160 is used as shown, it can spread light coming from such point emitters so that the light remains directed in the general direction of light 10 as shown in FIG. 2A, but light from individual point emitters is smoothed across a large area so as to eliminate bright spots when luminaire 100 is viewed from below. A smooth profile, such as a Lambertian profile, received at surface 141 of optical sheet 140 works well. Then, optical sheet 140 and film stabilizer 150 can be used as described above, starting with input light intensity that is smoother across the area of optical sheet 140, to work with. Either or both surfaces of diffuser 160 may be used to impart diffusion to the light passing therethrough, and/or, diffuser 160 may be made of a volumetric diffusing material (e.g., a material with small scattering sites embedded within the material itself). FIG. 2D, discussed below, illustrates how diffuser 160, and a controlled distance between point light sources and diffuser 160, smooth out light provided by point sources across the area of luminaire 100.

FIG. 2D schematically illustrates spacing among discrete light sources 131, and a distance between the light sources 131 and diffuser 160, that is effective to mitigate an unattractive appearance of individual light sources 131 as seen to a viewer of a luminaire. Light source 130, discussed above, can consist of individual light sources 131, one row of which is shown in FIG. 2D. Some individual ones of these light sources are labeled as 131(1), 131(2), 131(3) and 131(4), with ellipses indicating that further light sources could be present in either direction. Light sources 131 are typically arranged in a planar arrangement, give or take normal manufacturing tolerances. Other arrangements are possible, but may cause a resulting luminaire to increase in thickness, which may be undesirable. Each light source 131 might emit light with a Lambertian intensity pattern, indicated as a circle with light ray intensity arrows inside the circle, for each of light sources 131. A physical pitch between adjacent ones of the light sources 131 is shown as $P_{LS}$. Optional diffuser 160, optical sheet 140 and film stabilizer 150 are shown adjacent to one another (e.g., touching) in FIG. 2D, which is a possible configuration but is by no means required.

The present inventors have found that there is a design tradeoff involving a distance $D_{LSD}$ between light sources 131 and diffuser 160. Specifically, while keeping $D_{LSD}$ small favors a compact design, light sources 131 can be so close to diffuser 160 that individual light sources can easily be seen by a viewer, which creates an unattractive look. This can be mitigated somewhat by increasing the diffusive properties of diffuser 160, but the tradeoff there is that high diffusion almost necessarily means low optical efficiency. That is, the light from light sources 131 is forced to bounce around so much that quite a bit of it is converted to heat instead of being emitted through the light fixture. A typical value of optical transmission for diffuser 160 is about 70% to 75%. Higher and lower values of optical transmission are possible, with the understanding that higher values may not provide enough diffusion to obscure individual point sources 131, and lower values will convert more light to heat.

The present inventors favor a ratio of $P_{LS}$ to $D_{LSD}$ of about 1:1, that is, to provide the same spacing between light sources as a group, and diffuser 160, as the horizontal spacing between the light sources. In such a case, as can be seen from FIG. 2D, adjacent distributions have plenty of space to overlap with one another so that the overall spatial uniformity reaching diffuser 160 is better than if diffuser 160 were placed up against light sources 131. It would be possible to place many individual light emitters very close to keep $P_{LS}$ small, but that increases part count and cost. For commercial embodiments (e.g., those intended to provide lighting across ceiling sections with a nominal area of 2×2 feet, at a typical height of 8 feet above a floor) a useful $P_{LS}$ and $D_{LSD}$ are both about 1.0 inch, which is consistent with a light fixture thickness of about 1.5 inches (excluding areas that may be thicker due to housing electronic components).

The present inventors have found that any combination of diffusion amount provided by diffuser 160, and distance $D_{LSD}$, that reduce variations of light intensity across the area of light at surface 141 of optical sheet 140 to no more than 50% between any two points on optical sheet 141, is sufficient to provide a look that does not have distracting light spots. That is, when not diffused at all, light provided directly by individual light sources 131 may vary greatly (e.g., by orders of magnitude) from light coming from areas between sources 131, but when that variation is reduced to less than 50% point to point across an area, the light sources are barely discernible, or not discernable at all. Not only is this less distracting, but uniform illumination can greatly enhance the aesthetic appeal of luminaires having optical sheets that provide a 3D appearance. This is because the viewer does not have to dissociate the visual appearance of bright point sources from the 3D look of the luminaire, even subconsciously. Without bright point sources, the 3D look is much more prominent on its own.

Figure 3A:
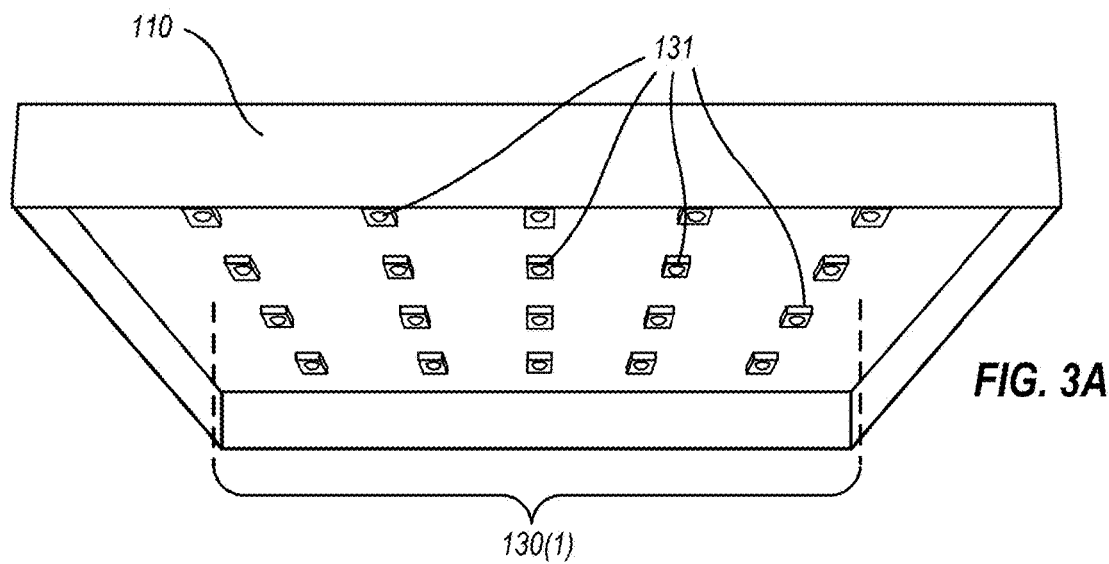
FIG. 3A schematically illustrates a light source that includes many individual point light emitters, that can be used in luminaires described herein, in accord with one or more embodiments.
Figure 3B:
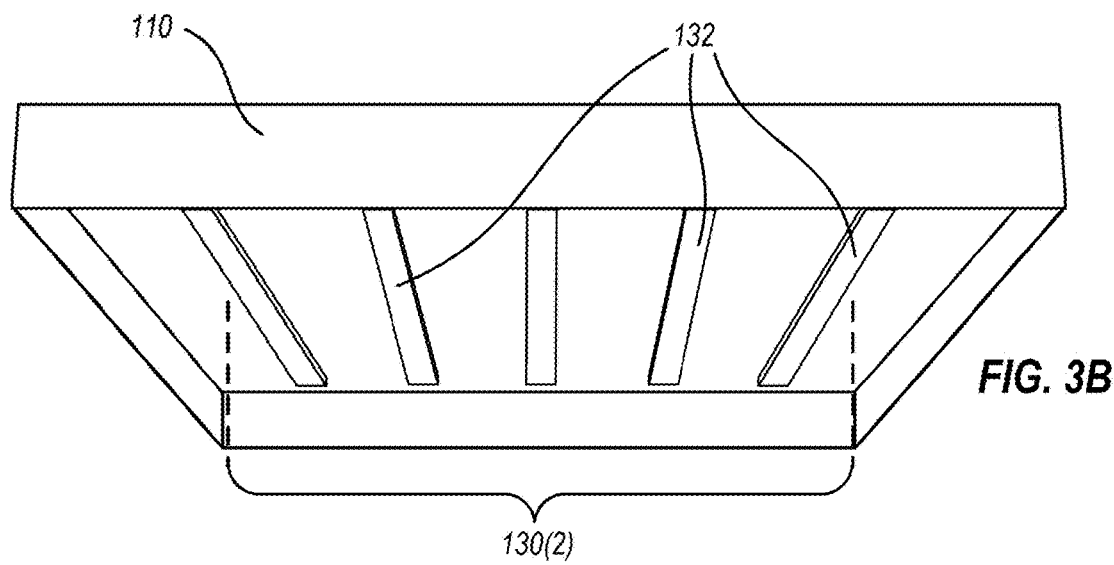
FIG. 3B schematically illustrates a light source that includes several linear light emitters, which can be used in luminaires described herein, in accord with one or more embodiments.

It should be understood that FIG. 2D and the discussion above would apply equally to light sources 130 that are formed of line light sources perpendicular to the plane of FIG. 2D (e.g., see FIG. 3B). That is, the two-dimensional representation of FIG. 2D would simply be repeated pointwise down the length of the line light sources, the result being that providing the same spacing and diffusion properties between line light sources and diffuser 160 would result in mitigating the appearance of the line light sources.

The principles discussed with respect to diffuser 160 can also be applied to optics that may be integrated with light source 130. For example, when light source 130 includes point (and/or linear) light emitters, optics may be included in light source 130 that spread the points and/or lines of light into a smoother area distribution emitted toward optical sheet 140.

It will be appreciated by one skilled in the art that the ability to control directionality and/or diffusion at two, three or more separate layers of a luminaire opens up new lighting possibilities, especially in commercial indoor lighting. While luminaires typically emit Lambertian distributions, many other distributions become possible; for example, in addition to merely decorative appearance, a luminaire can provide different and useful lighting distributions such as the so-called "batwing" distribution that pushes light into certain corners of an illuminated area. Volumetric distributions, one- or two-dimensionally asymmetric, and other distributions are also possible.

Once a film stabilizer 150 is incorporated, many other, advantageous variations and techniques become possible. For example, in one or more embodiments, film stabilizer 150 can be adapted to include some or all of the functions of optical sheet 140. That is, the features on optical sheet 140 that provide the light shaping properties can be fabricated directly into, and/or onto, film stabilizer 150, so that optical sheet 140 can be omitted. Conversely, optical sheet 140 may be made thicker so as to have the mechanical rigidity of film stabilizer 150, and may have the diffusion characteristics of film stabilizer 150. Additionally, different effects can be created by orienting the optically active surface(s) of optical sheet 140 toward or away from diffuser 160. That is, when surface 141 is planar (e.g., surface 142 is the optically active surface) the light input to optical sheet will be received within an angular range limited by reflection of some rays at surface 141. Steeper rays will be refracted into optical sheet 140 at angles determined by the rays' incidence angles and the refractive index of optical sheet 140. Some shallow light rays (only a small fraction of light received at surface 141, since light emitted as Lambertian is inherently concentrated into steeper angles) will be reflected from surface 141 toward the general direction of diffuser 160, and may bounce around among diffuser 160, surface 141 and/or housing 110 until dissipated as heat or diverted into steeper angles. But if surface 141 is the optically active surface, having facets or other surface features that modify the outward angle of surface 141 from point to point, light reflected from or entering optical sheet will be a function of light angle, refractive index of optical sheet 140 and the angle of surface 141 at every given point.

Figure 3C:
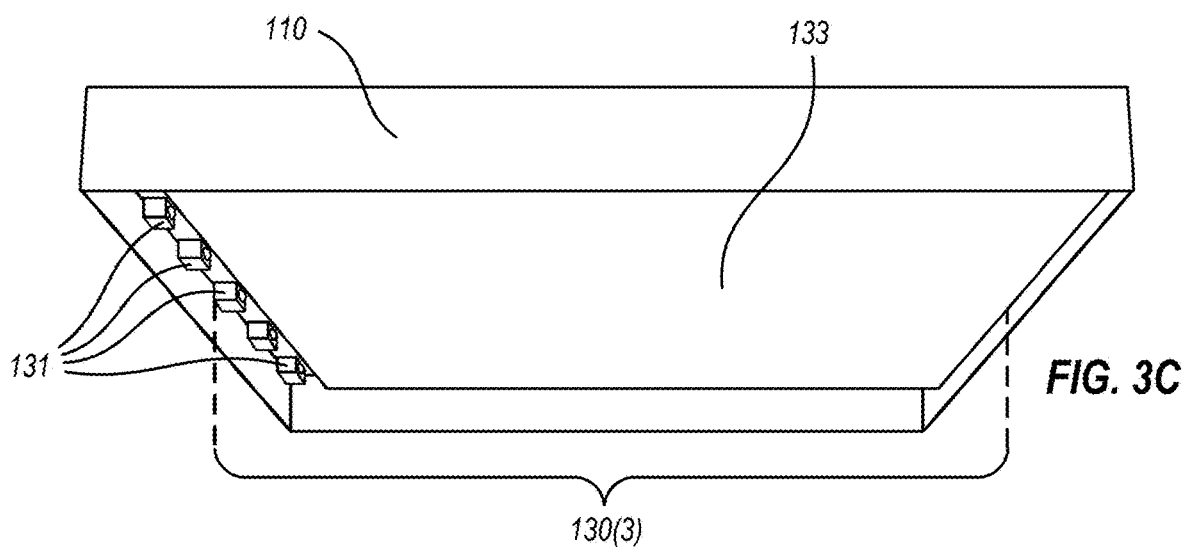
FIG. 3C schematically illustrates a light source that includes a light guide that receives and redistributes light from point emitters, which can be used in luminaires described herein, in accord with one or more embodiments.

FIGS. 3A, 3B and 3C are schematic illustrations of various light sources 130 that can be used in luminaires described herein. FIG. 3A schematically illustrates housing 110 with a light source 130(1) that includes many individual point light emitters 131 (only representative ones of point light emitters 131 are labeled, for clarity of illustration). Any type of point light emitters may be used, for example LEDs or incandescent lights, but LEDs will be typically used, and the discussion below will refer to point light emitters 131 as LEDs. Any number of individual LEDs 131 may be used in light source 130(1), they may couple with housing 110 in any desired manner, and they may be packaged LEDs or LED chips. LEDs 131 may also be arranged in any two- or three-dimensional format; a gridlike layout, such as illustrated in FIG. 3A, may be used but is not required. LEDs 131 may be coupled with a printed circuit board or other known substrate for mounting and supplying power to LEDs.

FIG. 3B schematically illustrates housing 110 with a light source 130(2) that includes several linear light emitters 132 (only representative ones of linear light emitters 132 are labeled, for clarity of illustration). Linear light emitters 132 may be formed in a number of ways, such as for example rows of LEDs or other point light emitters (individual point emitters are not labeled in FIG. 3B), or fluorescent tubes. Either light source 130(1) or 130(2) may include optics to spread light from point emitters such as LEDs 131, or linear light emitters 132, into broad area light sources, and may further collimate the spread-out light for efficient manipulation by optical sheets 140, film stabilizers 150 and/or diffusers 160, as discussed above.

FIG. 3C schematically illustrates housing 110 with a light source 130(2) that includes a light guide 133 that receives and redistributes light from point emitters 131 (only representative ones of point emitters 131 are labeled, for clarity of illustration). Although FIG. 3C only shows point emitters 131 emitting light into one side of light guide 133, it is understood that point emitters may be arranged about a periphery of light guide 133 in any manner, for example two, three or four edges of a rectangular light guide 133, or distributed along a curved edge. Light guide 133 is configured to substantially contain light received from point emitters 131 by total internal reflection so that the light spreads out within light guide 133. Extraction features on either a top or bottom surface of light guide 133 disrupt the total internal reflection condition so that the light can be redirected downwards, out of light guide 133. Type, orientation and density of the extraction features can vary so as to provide output light that is well distributed across the lower surface of light guide 133, avoiding distracting bright spots corresponding to individual light emitters. These techniques are described in greater detail in U.S. patent application Ser. No. 16/879,545, which is incorporated herein by reference.

Figure 4:
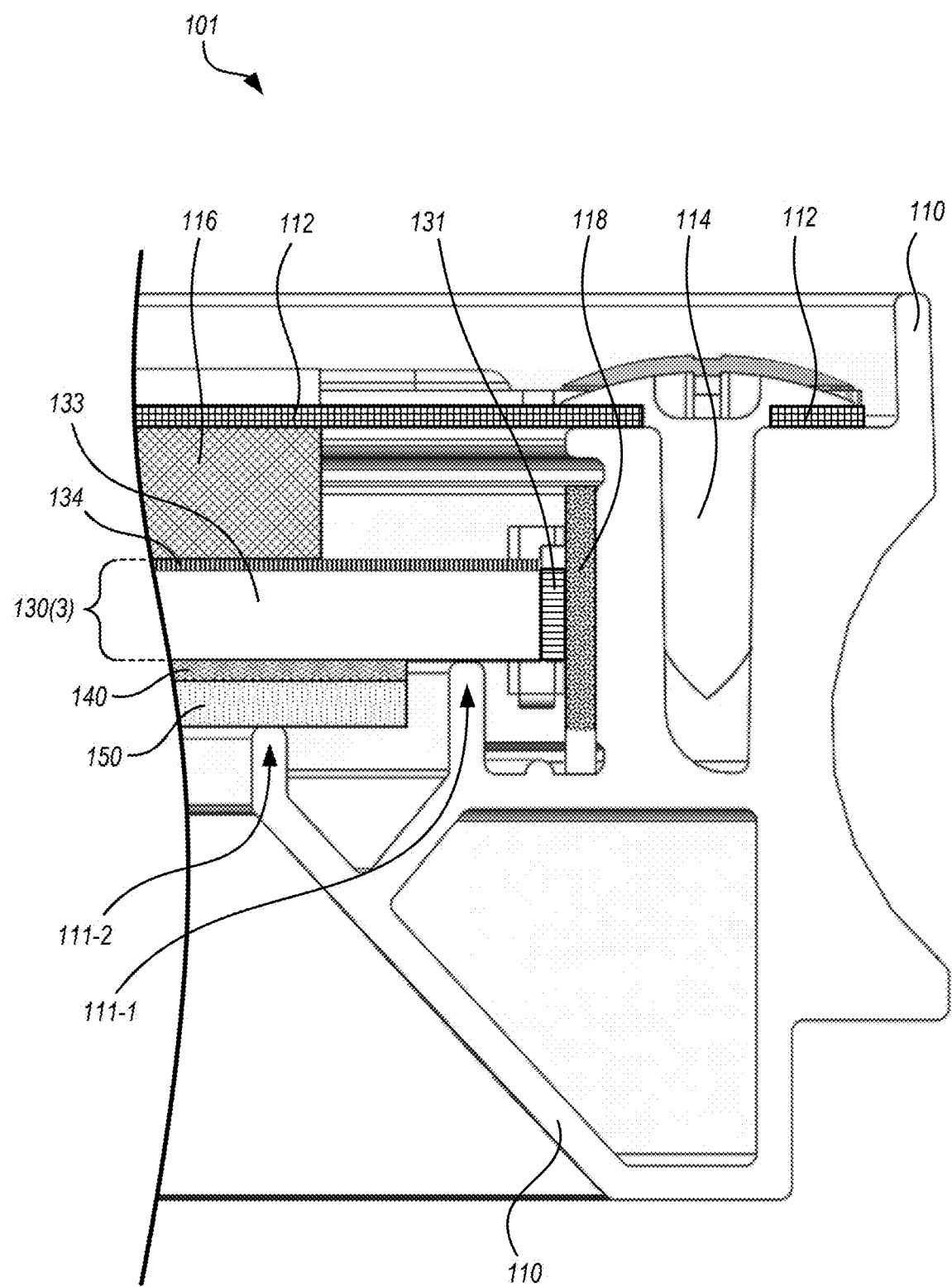
FIG. 4 schematically illustrates, in a cross-sectional view, a portion of a luminaire that utilizes a light guide, in accord with one or more embodiments.

FIG. 4 schematically illustrates, in a cross-sectional view, a portion of a luminaire 101. Luminaire 101 may be considered an example of luminaire 100, FIGS. 1 and 2A, and of the luminaire portion shown in FIG. 3C. Luminaire 101 includes a housing 110, a light source 130(3), an optical sheet 140, and a film stabilizer 150. All of light source 130(3), optical sheet 140, and film stabilizer 150 are coupled with housing 110. Light source 130(3) includes a light emitter 131 (mounted with a printed circuit board 118), and a light guide 133 faced with a reflective layer 134. A first surface of optical sheet 140 is substantially horizontal when luminaire 101 is in an installed orientation, as shown in FIG. 4 (surfaces of optical sheet 140 and film stabilizer 150 are not labeled in FIG. 4 for clarity of illustration, but are labeled in FIG. 2A). The first surface of optical sheet 140 faces light source 130(3), so that when LEDs 131 emit light, the light is redirected by extraction features of light guide 133 toward optical sheet 140, and the light passes first through the first surface and subsequently through the second surface of optical sheet 140. Film stabilizer 150 includes a third surface and an opposing fourth surface (see FIG. 2A for labeling of these surfaces), is coupled with housing 110, and disposed so that the third surface is adjacent to the second surface of optical sheet 140.

Optical sheet 140 significantly redirects light passing therethrough, and in some embodiments has spatial regions that redirect the light in different manners, so as to create an image that is discernible at a typical viewing distance from luminaire 101. In other embodiments, optical sheet has spatial regions that modify intensity of light passing therethrough, also to create an image that is discernible at a typical viewing distance from luminaire 101. In still other embodiments, optical sheet 140 both redirects and modifies intensity of light passing therethrough. Film stabilizer 150 provides mechanical support for optical sheet 140, for example to keep optical sheet 140 from sagging across large spans of luminaire 101. To provide suitable support for optical sheet 140, film stabilizer 150 may be formed, for example, of PMMA with a thickness in the range of 0.5 mm to 4.0 mm between the third and fourth surfaces as defined above, advantageously with a nominal thickness of 1.2-2.0 mm, plus or minus a normal manufacturing tolerance. Film stabilizer 150 may or may not significantly redirect light passing therethrough; in some embodiments film stabilizer 150 provides diffusion of between two and ten degrees to the light.

Housing 110 may provide features that facilitate assembly and/or performance of luminaire 101, and other components may also be added to make luminaire 101 mechanically robust while keeping manufacturing simple and inexpensive. For example, housing 110 may form shelves 111-1 and 111-2, as shown in FIG. 4, to simplify assembly of film stabilizer 150, optical sheet 140, and light guide 133. Film stabilizer 150 and optical sheet 140 may be sized so that they can be placed on shelf 111-2 but be surrounded laterally by shelf 111-1. In a typical assembly process, either printed circuit board 118 with light emitters (LEDs) 131 may be coupled with housing 110, and film stabilizer 150 and optical sheet 140 may be placed on shelf 111-2, in either order. Then, light guide 133 and reflective layer 134 may be placed on shelf 111-1 so as to be adjacent to (and optionally, in contact with) optical sheet 140, with edges of light guide 133 positioned so as to capture light emitted by light emitters 131. A foam layer 116 can be placed atop reflective layer 134, and a top plate 112 may be placed atop foam layer 116, with top plate 112 fastened to housing 110 using one or more fasteners 114 (e.g., a bolt, screw, rivet or the like). The view of FIG. 4 being at only one point around a periphery of housing 110, any number or type of fasteners 114 may be used for a complete luminaire. Foam layer 116 can yield slightly under mechanical pressure, to ensure good optical coupling among light guide 133, optical sheet 140 and film stabilizer 150 while not damaging features of optical surfaces thereof, and allowing for looser mechanical tolerances of the optical components and of housing 110. In some embodiments, the features of optical sheet 140 and/or film stabilizer 150 can be incorporated directly onto light guide 133. That is, the technique of using an optical sheet 140 and/or a film stabilizer 150 with a light guide 133 that has extraction features, can also be generalized into creating a light guide 133 that has light extraction features on a top surface, and scattered light steering on a bottom surface, thereof. The scattered light steering can impart three-dimensional effects, control diffusion and the like, as discussed above.

Another issue that can occur with light guides and light shaping films is that a light guide and light shaping film can pick up high angle light from the light emitters (referenced herein as LEDs, although other light emitters can be used).

High angle light can scatter out of the light guide very near to the LEDs themselves because at high angles, the light will not be contained within the light guide by total internal reflection. When this occurs, the edges of the luminaire can emit a disproportionate amount of light, compromising spatial uniformity of luminance across the luminaire (that is, a bright band of light appears, near the location of the LEDs). This is addressed in luminaire 101 by providing shelves 111-1 and 111-2 in housing 110. In addition to simplifying assembly, shelves 111-1 and 111-2 also act as light stops for high angle light from light emitters 131, so that only low angle light propagates through the light guide and uniformly out of the light shaping film and film stabilizer.

Another issue that can arise with use of an edge-lit light guide 133 is that light density within light guide 133 can differ between the edges that receive light from light emitters 131, and the center of light guide 133. To counteract this effect, in one or more embodiments the density of scattering features increases from the edges to the center of the light guide. Thus, a smaller percentage of a high density of light is scattered out of the light guide at the edges, and a larger percentage of a lower density of light is scattered nearer to the center.

The foregoing is provided for purposes of illustrating, explaining, and describing embodiments of the present invention. Further modifications and adaptations to these embodiments will be apparent to those skilled in the art and may be made without departing from the scope or spirit of the invention. Different arrangements of the components depicted in drawings or described above, as well as components and steps not shown or described, are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in drawings, and various embodiments and modifications can be made without departing from the scope of the claims below.

What is claimed is:

1. A luminaire, comprising:
   a. at least one light source;
   b. a light shaping film supported within the luminaire, wherein the light shaping film is substantially flat when supported within the luminaire and comprises a first surface and an opposing second surface and a light shaping film thickness defined between the first surface and the second surface of the light shaping film, wherein the first surface is disposed more proximate the at least one light source than the second surface so that light emitted by the at least one light source passes through the first surface and subsequently through the second surface; and
   c. a film stabilizer supported within the luminaire and comprising a first surface disposed adjacent the second surface of the light shaping film, an opposing second surface, and a film stabilizer thickness defined between the first surface and the second surface of the film stabilizer,
   wherein the film stabilizer thickness is greater than the light shaping film thickness and wherein the film stabilizer is adapted to reduce sagging of the light shaping film such that the light shaping film remains substantially flat when supported within the luminaire.

2. The luminaire of claim 1, wherein the first surface of the film stabilizer contacts the second surface of the light shaping film.

3. The luminaire of claim 1, wherein the light shaping film generates a pattern having a three-dimensional appearance despite the light shaping film being substantially flat.

4. The luminaire of claim 1, wherein the film stabilizer is adapted to diffuse light passing therethrough.

5. The luminaire of claim 4, wherein the film stabilizer is adapted to diffuse light passing therethrough between two and ten degrees.

6. The luminaire of claim 1, wherein at least one of the first surface or the second surface of the film stabilizer comprises a textured surface.

7. The luminaire of claim 1, wherein the film stabilizer comprises polymethyl methacrylate.

8. The luminaire of claim 1, wherein the film stabilizer thickness is in the range of 0.5 mm to 4.0 mm.

9. The luminaire of claim 1, wherein the light shaping film thickness is in the range of 0.1 mm to 1.5 mm.

10. The luminaire of claim 1, further comprising a light guide configured to receive light from the at least one light source through an edge of the light guide, and to emit at least a portion of the light from a light emitting surface of the light guide toward the first surface of the light shaping film.

11. The luminaire of claim 1, further comprising a housing frame adapted to support the light shaping film and the film stabilizer within the luminaire.

* * * * *